United States Patent
Bazlur Rashid

(10) Patent No.: US 6,176,382 B1
(45) Date of Patent: Jan. 23, 2001

(54) PLASTIC CONTAINER HAVING BASE WITH ANNULAR WALL AND METHOD OF MAKING THE SAME

(75) Inventor: A. B. M. Bazlur Rashid, Neenah, WI (US)

(73) Assignee: American National Can Company, Chicago, IL (US)

(*) Notice: Under 35 U.S.C. 154(b), the term of this patent shall be extended for 0 days.

(21) Appl. No.: 09/172,345

(22) Filed: Oct. 14, 1998

(51) Int. Cl.[7] ............................. B65D 1/02; B65D 23/00
(52) U.S. Cl. ................................ 215/373; 220/606
(58) Field of Search ........................... 215/373; 220/606, 220/608, 609

(56) References Cited

U.S. PATENT DOCUMENTS

| | | | |
|---|---|---|---|
| 3,718,229 | * 2/1973 | Wyeth et al. | 215/373 |
| 3,720,339 | 3/1973 | Khetani . | |
| 3,722,726 | * 3/1973 | Carmichael et al. | 220/606 X |
| 3,757,978 | * 9/1973 | Gilbert | 215/373 X |
| 3,870,181 | 3/1975 | Sincock . | |
| 3,973,693 | * 8/1976 | Brocklehurst | 220/606 X |
| 4,174,782 | * 11/1979 | Obsomer | 215/373 |
| 4,197,954 | * 4/1980 | Oltman et al. | 220/606 X |
| 4,276,987 | 7/1981 | Michel . | |
| 4,378,328 | * 3/1983 | Przytulla et al. | 220/606 X |
| 4,381,061 | * 4/1983 | Cerny et al. | 220/606 X |
| 4,465,199 | * 8/1984 | Aoki | 220/606 X |
| 4,755,404 | * 7/1988 | Coulette | 220/606 X |
| 4,780,257 | 10/1988 | Beck . | |
| 4,880,129 | * 11/1989 | McHenry et al. | 220/606 X |
| 4,892,205 | 1/1990 | Powers et al. . | |
| 4,894,268 | 1/1990 | Greenwood et al. | 428/36.42 |
| 4,969,563 | 11/1990 | Strassheimer . | |
| 4,978,015 | 12/1990 | Walker . | |
| 5,005,716 | * 4/1991 | Eberle | 220/606 X |
| 5,038,947 | 8/1991 | Strassheimer . | |
| 5,072,841 | 12/1991 | Okhai | 215/1 C |
| 5,198,248 | 3/1993 | Krishnakumar et al. . | |
| 5,269,437 | * 12/1993 | Gygax | 220/606 |
| 5,454,481 | 10/1995 | Hsu . | |
| 5,763,030 | 6/1998 | Matsui | 428/35.7 |

FOREIGN PATENT DOCUMENTS

| | | | |
|---|---|---|---|
| 0 320 151 | 6/1989 | (EP) . | |
| 4294735 | * 10/1992 | (JP) | 220/608 |
| 9220587 | * 11/1992 | (WO) | 220/609 |

OTHER PUBLICATIONS

European Search Report from corresponding European patent application EP 99 30 8124.

* cited by examiner

Primary Examiner—Sue A. Weaver
(74) Attorney, Agent, or Firm—McDermott, Will & Emery

(57) ABSTRACT

A plastic bottle comprises a base having a chime, a dome and an annular wall extending between the chime and the dome. The annular wall extends generally parallel to a longitudinal axis of the bottle to support the dome against inverting due to internal pressure and increases the bi-axial stretching of the base during blow molding to strengthen the material of the same. A method of making the plastic bottle of the present invention is also disclosed.

9 Claims, 2 Drawing Sheets

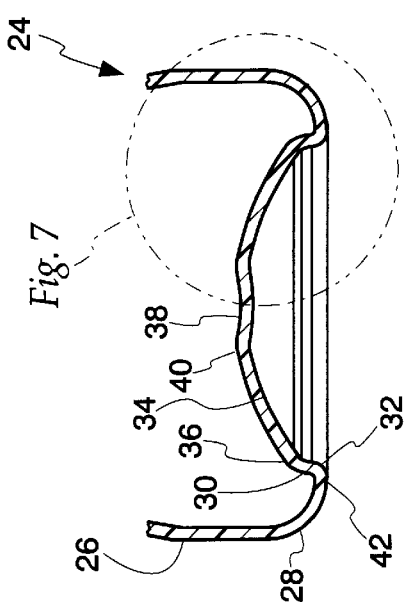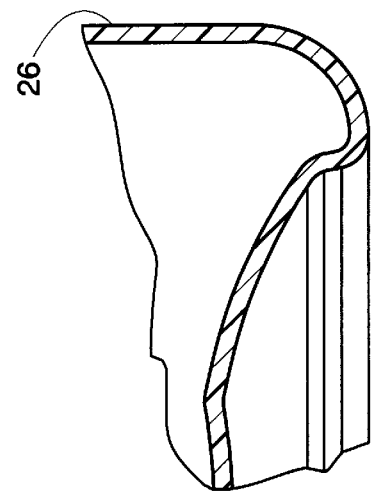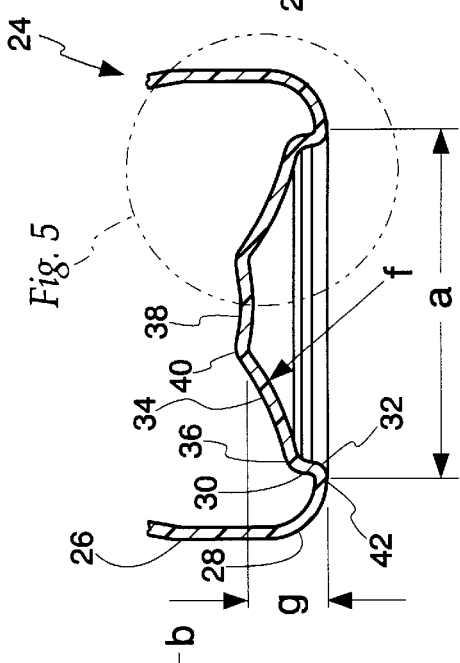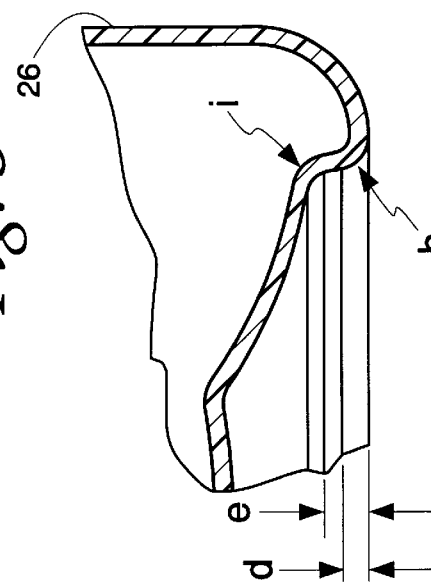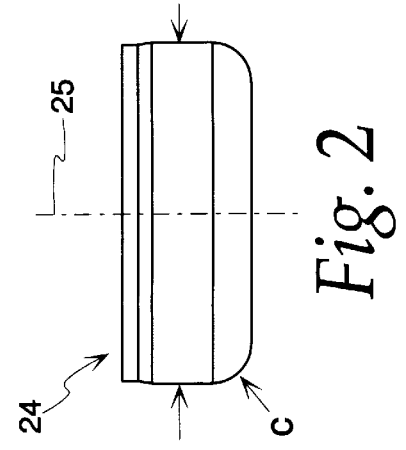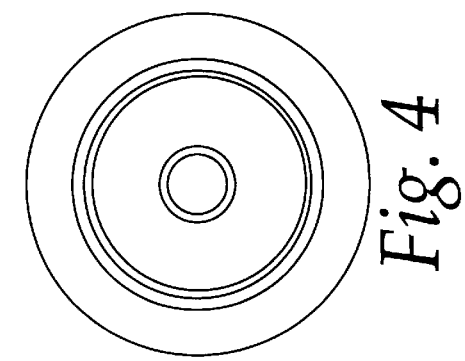

PLASTIC CONTAINER HAVING BASE WITH ANNULAR WALL AND METHOD OF MAKING THE SAME

BACKGROUND OF THE INVENTION

1. Field of the Invention

The present invention relates generally to plastic containers; particularly to plastic containers designed to hold liquids under pressure.

2. Background Art

Bottle bases comprising the standard champagne dome have long been employed with glass bottles and consumers have become accustomed to such base configurations. The standard champagne dome, as is well known in the art, is an arcuate dome that extends inwardly of the container from the chime portion of the container base. The champagne dome distributes forces exerted thereon by the internal pressure of the bottle. The standard champagne dome shape has evolved into various dome shapes in attempts to better withstand these forces. The integrity of the champagne dome becomes of greater importance when the bottle is intended to contain a product under pressured by, for example, carbonation. While the use of a champagne dome is desirable, application thereof to plastic containers has provided difficulties in the plastic container industry.

For reasons of efficiency and to lower production costs, the plastic container industry has embraced the conventional technique of blow molding plastic containers from plastic preforms. Furthermore, the industry often uses polyethylene terephthalate ("PET") or polypropylene ("PP") to construct plastic containers because of, among other reasons, the ability to reclaim and recycle containers constructed therefrom. A barrier layer constructed, for example, from ethylene vinyl alcohol ("EVOH"), is often employed with the PET or PP to inhibit the migration of gases such as oxygen and carbon dioxide as well as moisture into or out of, the container. In order to provide a plastic container constructed of PET or PP with desirable strength and clarity characteristics, it is desirable to impart bi-axial stretching to the material because the strength of any portion of a container blow molded from these materials directly correlates to the degree of bi-axial stretching experienced by that portion during the blow molding process. Thus, because the bi-axial stretching experienced at the base of a plastic container is relatively small in comparison to that experienced at other portions of the container, a relative decrease in material strength results at the base. Moreover, the formation of the preforms used for blow molding are typically formed by injection molding and leave an injection gate nib at the portion of the preform which corresponds to the plastic container base once the preform has been blown. The presence of the nib at the base has also been shown to result in decreased base strength. For all of the above reasons, the strength of the base of a plastic container is of specific concern to the plastic container industry. As with glass containers, the strength of a plastic container base is of special importance when employed to contain pressurized products such as a carbonated liquid including, for example, beer and soda.

The plastic container industry has found the standard champagne dome base to be an unacceptable configuration for blow molding of plastic bottles because, for example, the standard champagne dome has been found to be susceptible to inversion when constructed from plastic. Therefore, plastic container manufacturers have turned to alternative base configurations.

However, these alternative configurations typically comprise intricate base configurations having deficiencies rendering them unacceptable as well. For example, prior base configurations have replaced the standard chime with a plurality of feet segmented by ribs extending upward from the base. This configuration required more material than configurations not employing feet and ribs and thereby increased the overall cost of the configuration. Accordingly, in an attempt to reduce material consumption, the outer diameter of the base of this configuration was drastically reduced inward toward the longitudinal axis of the bottle and the cylindrical wall was gradually curved inward to the reduced outer diameter of the base. This reduced base configuration intruded substantially into a portion of the bottle that was traditionally reserved for the cylindrical wall of the body from which the base extends. Because the outer diameter of the lower most portion of the bottle was greatly reduced, the diameter of the contact ring upon which the bottle would be expected to stand and, therefore, the ability of a bottle comprising this base configuration to remain erect, was drastically reduced.

Importantly, the feet, ribs and reduced outer diameter of this base configuration provided an appearance to consumers which differed substantially from traditional configurations such as those commonly found in glass containers and to which consumers had become accustomed. Indeed, customer expectations call for a base configuration that does not contain feet. The beer industry provides one example of these customer expectations. It is desirable at certain times (e.g. sporting events) to provide consumers with beer contained in plastic bottles rather than glass bottles which can cause personal injuries; especially when broken. However, consumers have become accustomed to certain bottle shapes in which they expect beer to be contained. Variation from these shapes may result in loss of sales or good will. Accordingly, the intricate configurations of prior art plastic bottle bases are not applicable to all products for which a plastic container is desired and, specifically, not acceptable as containers for beer.

A standard practice used to blow mold plastic containers is to slightly increase the thickness of a majority of the base relative to the thickness of the remainder of the bottle. Preforms used to construct a bottle having such a base are known and do not require complex configurations. However, other attempts to blow mold an acceptable plastic bottle have placed material concentrations in specific predetermined areas of the base to increase the amount of stress that could be withstood without failing. One such base configuration used a stepped base to increase the thickness of the dome to a thickness that is substantially thicker than the dome of a standard base. This configuration increased material consumption and the difficulty of constructing the preforms. Because plastic containers are usually produced in extremely high volume, economies of scale made these configurations prohibitive.

Another example of using material concentrations teaches a plastic bottle base of the champagne base variety having a reinforced hoop to deter the champagne dome from inverting due to internal pressure of the bottle. However, an intricate preform was required to direct material concentrations to the necessary areas of the base to form the reinforced hoop. Increased costs and production difficulties resulted in the manufacture of these preforms as well.

SUMMARY OF THE INVENTION

It is one of the principal objectives of the present invention to provide a plastic bottle having a strong base.

It is another objective of the present invention to provide a plastic bottle comprising an annular wall in the base.

It is another objective of the present invention to provide a plastic bottle base having a substantially straight outer wall.

It is another objective of the present invention to provide a plastic bottle base of the champagne dome variety that will resist inversion from internal pressure.

It is another objective of the present invention to provide a plastic bottle that is cost effective and has a strong base area which is resistant to cracking, rupture or inversion.

It is another objective of the present invention to provide a plastic bottle having a strong base and capable of being blow molded from a standard preform.

It is another objective of the present invention to provide a process for making a plastic bottle comprising a champagne dome raised by an annular wall.

It is still another objective of the present invention to provide a plastic bottle having a strong base constructed by blow molding and without ribs in the base.

BRIEF DESCRIPTION OF DRAWINGS

FIG. 2 is a side elevational view of the base of the container shown in FIG. 1.

FIG. 3 is a cross sectional view of the container base shown in FIG. 2.

FIG. 4 is a bottom elevational view of the container base shown in FIG. 2.

FIG. 5 is a cross sectional view of a portion of the container base shown in FIG. 2.

FIG. 6 is a cross sectional view of an alternative container base according to the present invention comprising a champagne dome.

FIG. 7 is a cross sectional view of a portion of the container base shown in FIG. 6.

DETAILED DESCRIPTION OF THE DRAWINGS

Figure 1:
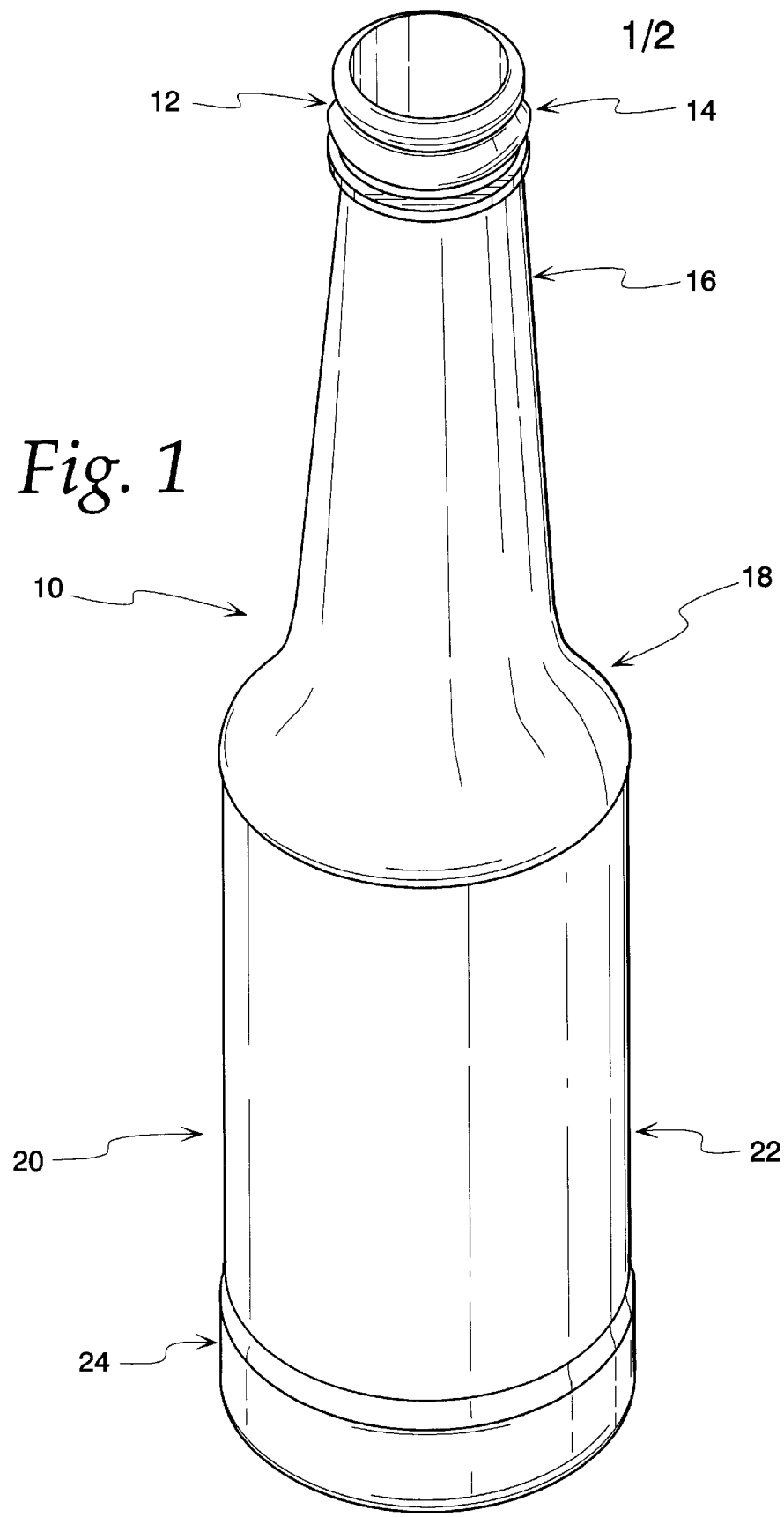
FIG. 1 is a perspective view of a container according to the present invention.

A container according to the present invention is depicted in FIG. 1 in the form of a bottle 10. FIG. 1 depicts a bottle 10 of the present invention having a top end 12 with a crown finish 14 for receiving a crown closure (not shown) to seal the bottle 10 after filling with a desired product. A tapered neck portion 16 integrally extends downward and outward from the top end 12 widening to form integrally with a rounded shoulder 18. Rounded shoulder 18 then extends integrally into a body portion 20 of the bottle 10 wherein the body portion 20 comprises a cylindrical wall 22. A base 24 of the bottle 10 extends integrally from, and closes the bottom end of, the body portion 20. Preferably, the bottle 10 is formed as an integral unit by blow molding the bottle from a standard preform using conventional blow molding techniques, as will be described in more detail below. The base 24 is depicted in FIG. 2 dissected from the remaining portions of the bottle 10.

Turning to FIG. 2 and 3, it can be seen that all portions of the base 24 of the bottle 10 preferably extend about a longitudinal axis 25 of the bottle 10 in an annular fashion providing the bottle 10 with symmetry about the longitudinal axis 25. It is noted, however, that deviations from symmetry about the longitudinal axis 25 may occur without departing from the scope of the present invention.

FIG. 3 depicts the base 24 of the present invention having a substantially straight outer wall 26 extending integrally into a chime 28 which curves inward from the substantially straight outer wall 26. An annular wall 30 is positioned radially inward of the chime 28 and is integrally connected to the chime 28 by a first arcuate shoulder 32. A dome 34 extends inward of the annular wall 30 and is integrally connected to the annular wall 30 by a second arcuate shoulder 36. Furthermore, a central portion 38 is integrally connected to the dome 34 by a third arcuate shoulder 40 thus closing the base 24.

The substantially straight outer wall 26 of the base 24 is preferably oriented generally parallel to the longitudinal axis 25 of the bottle 10 and is preferably formed integrally with the chime 28 which rounds inwardly toward the center of the bottle 10 and forms a contact ring 42 which is preferably located at the point where the tangent of the curvature of the chime 28 is perpendicular to the longitudinal axis 25 of the bottle 10. The base 24 thus provides the annular contact ring 42 about the longitudinal axis 25 and upon which the bottle 10 may be supported in an upright position. It is also contemplated, in the alternative, that the contact ring 42 may be extended inwardly to form an elongated contact ring (not shown) extending perpendicular to the longitudinal axis 25 of the bottle 10 to provide a larger area of contact between the bottle 10 of the present invention and the surface upon which the bottle 10 is to be placed.

It has been found that by extending the lowermost end of the substantially straight outer wall 26 to a position which is as low (i.e. longitudinally close to the contact ring 42) as possible, the base 24 becomes structurally stronger and, for example, able to withstand greater radial forces. However, when the substantially straight outer wall 26 is extended too low, the chime 28 will necessarily comprise a small radius of curvature to connect the substantially straight outer wall 26 and the first shoulder 32. Furthermore, it is well known in the blow molding art that it is difficult to consistently blow acceptable bottles into portions having a small radius of curvature. Thus, standard blow molding techniques limit how low the substantially straight outer cylindrical wall 26 may extend. It has been found that, for bottles designed to hold approximately 330 ml of liquid, a substantially straight outer wall 26 extending approximately 0.276 inches above the contact ring 42, as shown in FIG. 2,3 and 5, allows for proper blow molding of a strong base 24.

Moreover, the substantially straight outer wall 26 is preferably substantially vertical (parallel to the longitudinal axis 25) and the tangent of the contact ring 42 is preferably substantially perpendicular to the longitudinal axis 25. Therefore, the chime 28 preferably extends through ninety degrees (90°) of curvature. Consequently, because the lowermost end of the substantially straight outer wall 26 extends to 0.276 inches above the contact ring 42, the radius of curvature of the chime 28 is also preferably 0.276 inches. Moreover, it has been found that this configuration provides greater stability for a bottle 10 to remain resting on the contact ring 42.

The first shoulder 32 extends integrally between the chime 28 and the annular wall 30 in order to eliminate crevices or angles into which a preform must be forced during the blow molding process and to minimize stress concentrations at the junction of the chime 28 and the annular wall 30. The annular wall 30 is preferably straight and extends upward from the first shoulder 32 generally toward the top end 12 and preferably generally parallel to the longitudinal axis 25 of the bottle 10. It is contemplated and believed that the annular wall 30 may extend upward at an angle anywhere between zero degrees (0°) and twelve degrees (12°) from parallel to the longitudinal axis 25 of the bottle 10. However, it has been found that an angle of between three degrees (3°) and six degrees (6°) inward from parallel with the longitudinal axis 25 provides the base 24 with optimum strength to prevent inversion of the dome 34. Moreover, extending the annular wall 30 at between three degrees (3°) and six degrees (6°) inward from parallel with the longitudinal axis 25 affords proper release of the bottle from the mold after the bottle 10 is formed. It is also contemplated that the present invention may be practiced when the annular wall 30 is varied from the preferred straight configuration.

The second shoulder 36 extends integrally between the annular wall 30 and the dome 34 to minimize stress concentrations at the junction there between. While the dome 34 may be of any dome variety, it is recognized that the dome 34 may emulate any of the standard champagne dome variety which are known in the art. The third shoulder 40 connects the dome 34 to the central portion 38. The central portion 38 will typically extend outward from the third shoulder 40 in a convex manner, as depicted in FIG. 3 and 5, as a result of contact with a stretch rod which stretches the preform along the longitudinal axis 25 during typical blow molding processes. It should be recognized, however, that the convex shape and the size of the central portion 38 are not critical to the present invention and other shapes are acceptable. Likewise, it should be understood that while the dome 34 is depicted in FIG. 3 and 5 as extending generally into the base 24, the dome 34 is depicted as extending in a convex manner between the second shoulder 36 and the third shoulder 40. However, the dome 34 may also extend between the first and second shoulders 32, 36 in, for example, a concave manner such as that depicted in FIGS. 6 and 7.

The base 24 comprises a slight increase in thickness (not depicted) consistent with the standard blow molding of bottles as described above. Specifically, it has been found that the thickness of the chime 28 begins to increase at a position adjacent to the contact ring 42 and continues into the annular wall 30, the dome 34 and the central portion 38. However, it is to be understood that this increased wall thickness is consistent with standard blow molding techniques and results from blowing standard preforms such that the base 24 of the present invention may be blown from a standard preform.

While it is contemplated that other dimensions will provide a strong base 24, certain preferred dimensions of the present invention have been found and are disclosed below with reference to the drawings. The preferred diameter (a) of the contact ring 42 is 1.731 inches. The preferred diameter (b) of the substantially straight outer wall 26 is 2.283 inches. The preferred radius of curvature (c) of the chime 28 is 0.276 inches (as discussed above). The preferred height (d) from the contact ring 42 at which the annular wall 30 begins is 0.063 inches. The preferred height (e) from the contact ring 42 at which the annular wall 30 ends is 0.110 inches when the annular wall 30 is configured to be between three degrees (3°) and six degrees (6°) from parallel to the longitudinal axis 25. The preferred radius of curvature (f) of the dome 34 is 1.200 inches. The preferred height (g) at which the central portion 38 sits above the contact ring 42 is 0.350 inches. The preferred radius of curvature (h) of the first shoulder 32 is 0.070 and the preferred radius of curvature (i) of the second shoulder 36 is 0.045 inches.

From the foregoing, it should become apparent to one of ordinary skill in the art that the bottle 10 of the present invention may be properly constructed by the well-known technique of blow molding in the standard manner heretofore known for plastic bottles. Because the strength of the base 24 of the present invention is in great part derived from the structural support presented by the annular wall 30 and the substantially straight outer wall 26 rather than material concentrations (as with prior bottles as discussed above), a standard preform as is known in the art may be, and preferably is, used. The costs of production are thereby reduced.

It should also be understood that blow molding of the tapered neck portion 16, the rounded shoulder 18 and the body portion 20 of the present bottle 10 occur in the normal manner of blow molding plastic bottles. The preform is then expanded toward the dome 34 and the preform approaches the substantially straight outer wall 26, the chime 28 and the annular wall 30. As the preform expands into the base 24 the unique configuration presented by the substantially straight outer wall 26 and the annular wall 30 causes the preform to be stretched downward and outward to easily expand into the large radius of curvature of the chime 28. Thus, the degree of radial stretching imparted to the preform remains constant until the chime 28 is reached. This differs from prior bottles discussed above having the inward radial intrusion of ribs or reduced outer diameters extending into the body because the substantially straight outer wall 26 of the present invention preferably extends relatively lower than in prior base configurations. Radial stretching of the preform in the base 24 of the present invention is thereby increased over prior bases.

Moreover, because the annular wall 30 generally departs only minimally from parallel to the longitudinal axis 25 (preferably between 3° and 6° as discussed above), the preform is afforded increased longitudinal stretching relative to the corresponding stretching experienced by a standard champagne base. Accordingly, the annular wall 30 cooperates with the substantially straight outer wall 26 to impart bi-axial stretching to the preform sufficient to strengthen the blown preform material to a level which may withstand the rigors to which the bottle 10 will be subjected. Importantly, the annular wall 30 has been shown to provide substantial structural support to the dome 34 to prevent the inversion or outward buckling of the dome 34 from the intended position depicted in FIG. 3 and 5. The intrusive ribs or material concentrations of prior bottles are thus unnecessary.

Accordingly, the bottle 10 of the present invention provides a plastic bottle comprising a base 24 having sufficient strength to withstand the rigors of a bottle filled with a carbonated or effervescent liquid such as beer or soda while generally maintaining the look and configuration of a traditional glass bottle to which the consuming public has become accustomed. The ribs and material concentrations of prior bottles and the costs associated therewith are avoided and a standard preform may therefore be employed to construct the present bottle 10. Likewise, the present bottle 10 avoids the indiscreet ribs and reduced outer diameter of prior bottles as well as the deficiencies associated therewith. Moreover, while it is specifically recognized that the present invention is applicable to produce a plastic beer or soda bottle, it is also recognized that the present invention is applicable to containers for other products.

It should be recognized that a bottle of the present invention may be constructed of any materials used for constructing plastic containers, including PET, PP and other polymeric resins without departing from the scope of the present invention. It should also be understood that the bottle 10 may include a barrier layer of an ethylene vinyl alcohol copolymer. Also, the present bottle 10 may be of single or multiple layers and constructed from preforms constructed by single layer injection or multilayer injection, including coinjection.

From the foregoing description, it will be apparent that the plastic container of the present invention has a number of advantages, some of which have been described above and others of which are inherent in the base 24 of the present invention. Also, it will be understood that modifications can be made to the plastic container of the present invention without departing from the teachings of the invention. Accordingly the scope of the invention is only to be limited as necessitated by the accompanying claims.

I claim:

1. A plastic bottle having a base comprising:
   an outer wall oriented substantially parallel to a longitudinal axis defined by said bottle;
   a chime extending from said outer wall;
   a dome; and
   a wall extending from adjacent to said chime at a wall first end to a wall second end adjacent to said dome;
   said dome extending generally inward of said base from said wall second end;
   said dome extending from said wall second end terminates at a bottle central portion closing the base; and
   wherein said wall is substantially straight and forms an angle of approximately six degrees with said longitudinal axis.

2. A plastic container comprising:
   a body portion;
   a neck portion extending from a first side of said body portion; and
   a base portion extending from and closing a second side of said body portion wherein said base portion comprises;
      an outer wall oriented substantially parallel to a longitudinal axis defined by said bottle;
      a wall having a first end and a second end opposite said first end;
      a chime extending from a position adjacent to said first end of said wall to said outer wall; and
      a dome extending from a position adjacent to said second end of said wall inwardly of said base portion terminating at a bottle central portion closing the base, and
   wherein said wall extends substantially straight between said first end thereof and said second end thereof and forms an angle of approximately six degrees with said longitudinal axis.

3. A plastic container comprising a base having:
   an outer wall oriented substantially parallel to a longitudinal axis defined by said container;
   a chime extending from said outer wall;
   a dome; and
   a wall extending from a position adjacent to said chime at a wall first end to a position adjacent to said dome at a wall second end;
   said dome located generally inward of said base from said wall second end; and
   wherein said wall is generally parallel to said longitudinal axis forming an angle of approximately six degrees with said longitudinal axis.

4. A plastic container having:
   a body portion;
   a neck portion extending from an upper end of said body portion; and
   a base portion extending from and closing a lower end of said body portion wherein said base portion comprises;
      a substantially straight outer wall oriented substantially parallel to a longitudinal axis defined by said container;
      a chime extending from said substantially straight outer wall;
      a champagne dome extending into said base portion; and
      a substantially straight wall extending substantially parallel to said longitudinal axis, between said chime and said champagne dome, recessing said champagne dome into said base portion, and said champagne dome comprising a single arcuate section, wherein said substantially straight wall extends at an angle of between zero and twelve degrees with said longitudinal axis.

5. The plastic container of claim 4 wherein said angle is approximately six degrees.

6. The plastic container of claim 5 wherein the champagne dome extending from a position adjacent to said chime terminates at a central portion closing the base.

7. The plastic container of claim 6 wherein the central portion is downwardly convex.

8. The plastic container of claim 4 wherein the champagne dome extending from a position adjacent to said chime terminates at a central portion closing the base.

9. The plastic container of claim 8 wherein the central portion is downwardly convex.

* * * * *